(12) United States Patent
Anderson et al.

(10) Patent No.: US 8,497,891 B2
(45) Date of Patent: Jul. 30, 2013

(54) ENHANCING OPTICAL DENSITY

(75) Inventors: Daryl E. Anderson, Corvallis, OR (US); Andrew L. Van Brocklin, Corvallis, OR (US); Paul Liebert, Corvallis, OR (US); Danny Kugler, Corvallis, OR (US); Cari Dorsh, McMinnville, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2390 days.

(21) Appl. No.: 10/732,047

(22) Filed: Dec. 9, 2003

(65) Prior Publication Data
US 2005/0068412 A1  Mar. 31, 2005

Related U.S. Application Data

(63) Continuation-in-part of application No. 10/660,991, filed on Sep. 12, 2003, now Pat. No. 7,084,894.

(51) Int. Cl.
*B41J 2/435* (2006.01)
*G11B 7/00* (2006.01)

(52) U.S. Cl.
USPC ........................... 347/224; 369/53.28

(58) Field of Classification Search
USPC .............. 347/224–225, 240, 251–254, 244; 369/44.32, 47.51, 53.28, 116
See application file for complete search history.

(56) References Cited

U.S. PATENT DOCUMENTS

| 5,541,900 | A  | * | 7/1996  | Ito et al. ............... 369/44.31 |
| 5,701,288 | A  | * | 12/1997 | Seong ................... 369/44.27 |
| 7,050,365 | B2 | * | 5/2006  | Morishima ............ 369/44.32 |
| 7,082,094 | B2 | * | 7/2006  | Morishima et al. ...... 369/116 |
| 7,355,932 | B2 | * | 4/2008  | Shirakawa et al. ..... 369/44.32 |
| 2003/0072908 | A1 | | 4/2003 | Anderson |
| 2003/0117932 | A1 | | 6/2003 | Morishima |
| 2004/0004912 | A1 | | 1/2004 | Morishima |
| 2006/0193237 | A1 | | 8/2006 | Morishima |
| 2006/0239159 | A1 | | 10/2006 | Morishima |

FOREIGN PATENT DOCUMENTS

| EP | 1308938 A2 | 7/2003 |
| EP | 1355191    | 10/2003 |
| EP | 1355191 A1 | 10/2003 |
| EP | 1367570 A2 | 12/2003 |
| EP | 1686572 A2 | 2/2006 |
| JP | 2003-203348 | 7/2003 |
| JP | 2003-242669 | 8/2003 |
| WO | PCT/US2004/039925 | 11/2004 |

OTHER PUBLICATIONS

Office action in counterpart India (IN) patent application, 1703/CHENP/2006, dated Mar. 23, 2011.

* cited by examiner

*Primary Examiner* — Hai C Pham

(57) ABSTRACT

Optical density is enhanced on print media darkened by exposure to electromagnetic radiation. The print media is divided into at least one track. A defocused spot of electromagnetic radiation is created within the track. The defocused spot of electromagnetic radiation darkens the print media within the track.

8 Claims, 4 Drawing Sheets

ENHANCING OPTICAL DENSITY

RELATED APPLICATIONS

This patent application is a continuation-in-part of commonly assigned U.S. patent application Ser. No. 10/660,991, titled "Optical Disc Drive Focusing Apparatus", filed on Sep. 12, 2003 and herein incorporated by reference. This application is also related to commonly assigned U.S. patent application Ser. No. 10/661,394, titled "Optical disk Drive Focusing Apparatus", filed on Sep. 12, 2003 and herein incorporated by reference. This application is also related to commonly assigned U.S. patent application Ser. No. 10/661,752, titled "Optical disk Drive Focusing Apparatus", filed on Sep. 12, 2003 and herein incorporated by reference.

FIELD OF THE INVENTION

This invention relates in general to print media darkened by exposure to electromagnetic radiation and, more particularly, to enhancing optical density on the print media.

BACKGROUND OF THE INVENTION

Conventionally, optical disks are marked on a data side using laser activated material to produce darkened spots to indicate data. The darkened spots are read by an optical disk drive. The optical disk drive reads the data by emitting light at the disk and sensing whether the light is reflected back.

In order to more fully utilize the space available on an optical disk, it is desirable to fit as much data on a disk as possible. To achieve this goal, the spot size is reduced to increase the density of data stored. The spot size is reduced as much as possible while still maintaining the ability to read and write the data accurately.

Optical disks may also be labeled with an image. A laser-activated material is applied to the disk on the label side. The laser-activated material is darkened or marked by exposure to the laser in an optical disk drive.

The amount of time it takes to create or print a label on the laser-activated material is a function of the velocity at which the disk rotates and the width of the tracks on the disk. Higher velocities reduce the printing time, but there is an upper limit to the velocity at which the disk may be rotated and the labels printed.

Conventionally, wider tracks reduce the print time, but allow unmarked space between the tracks. The wider tracks are often spaced further apart than the width of a well-focused marking beam in order to decrease the time needed to create the label. The unmarked space visually combines with the marked space to give the appearance of a less than completely marked area. Where the unmarked space is white or another light color and the marked space is intended to be black, the result may appear to be less than completely black.

A measure of the amount of light absorbed is an optical density (OD). An area that appears to a user to have full absorption appears black and has an OD of 1.2. Higher OD values are possible, but they do not appear to be darker to a user. Conventional use of wider tracks often results in an OD of less than 1.2.

Narrower tracks result in more tracks per inch on the disk, which create darker images, as there is less unmarked space between the tracks. However, narrower tracks require longer printing times as there is more surface area for the laser to cover. Therefore, there is a tradeoff between printing speed and OD. A label printed using conventional techniques may be created using narrower tracks and having an OD of at least 1.2, but it will take longer to print than a label created using wider tracks and having an OD less than 1.2.

SUMMARY OF THE INVENTION

According to principles of the present invention, in one embodiment, optical density is enhanced on print media darkened by exposure to electromagnetic radiation. The print media is divided into at least one track. A defocused spot of electromagnetic radiation is created within the track. The defocused spot of electromagnetic radiation darkens the print media within the track.

DETAILED DESCRIPTION OF THE INVENTION

The present disclosure describes a method and apparatus for enhancing optical density on optically labeled media such as optical discs. Empirical research by the inventors has shown that by defocusing a laser spot size rather than using a focused laser spot, a larger marking spot can be achieved on the optically labeled media without having to decrease the linear speed of the media relative to the laser. These empirical results show gains of up to 30% in OD while defocusing the laser at the same time as holding the track spacing and linear velocity constant. The defocusing is done by creating an offset signal that is added to the focusing servo of the laser which normally maintains a constant best focus as discussed in the related cases. This focus offset scheme helps regain a significant amount of OD lost due to the "dead space" between "over spaced" tracks. Further, this invention allows the OD to be increased without increasing the time required to label the media.

Figure 1:
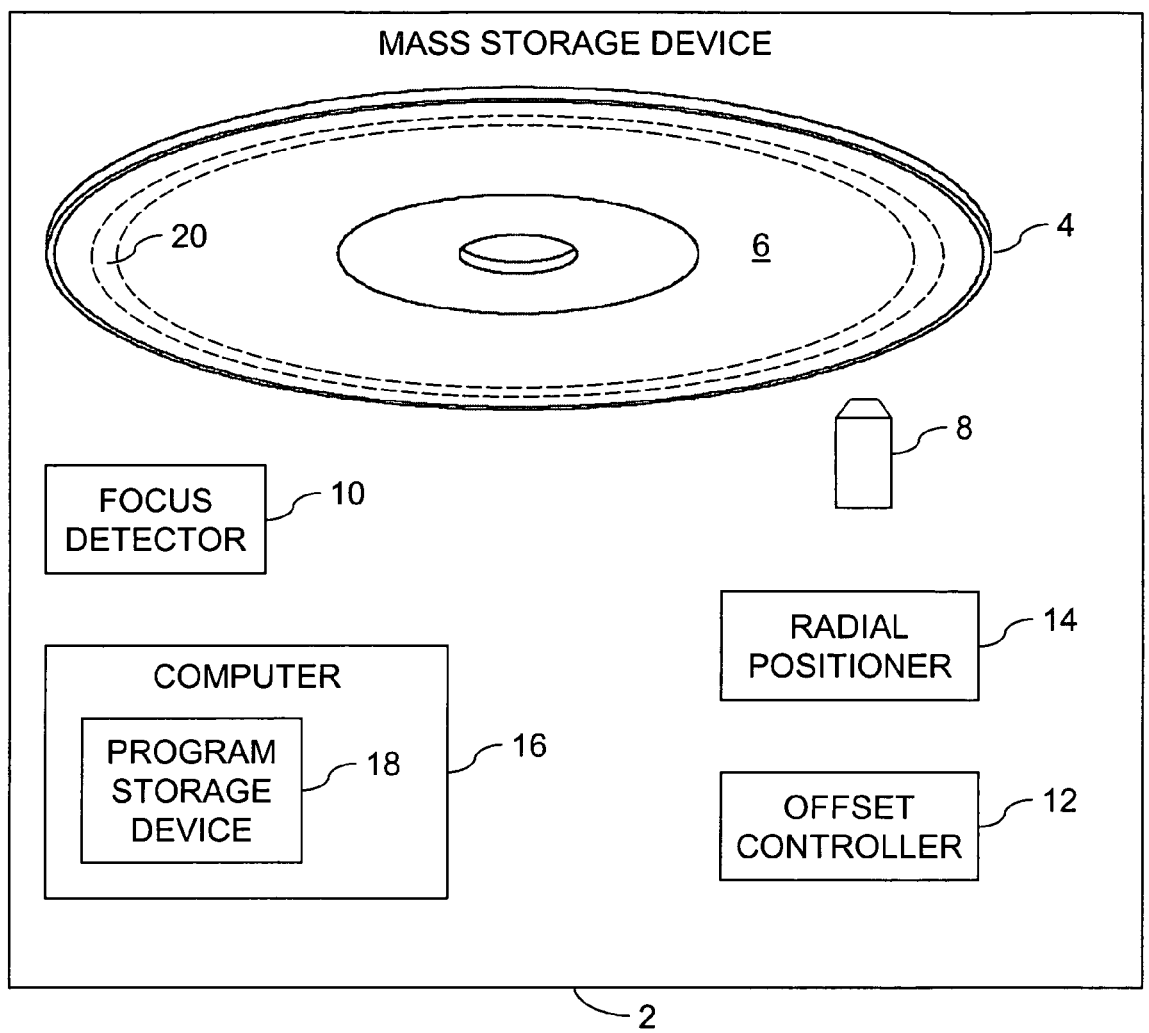
FIG. 1 is a depiction of a mass storage device with a radial positioner configured to offset the focus of the electromagnetic radiation emitter in accordance with the invention.

Illustrated in FIG. 1 is one embodiment of mass storage device 2 of the present invention. Mass storage device 2 is configured for use with mass storage media 4 having print media 6 coating at least a portion of mass storage media 4.

Mass storage media 4 is any media upon which information may be stored. In one embodiment, mass storage media 4 is an optical disk.

Print media 6 is any media upon which an image is printed by exposure to electromagnetic radiation. Print media 6 darkens, lightens, changes reflection or otherwise changes its optical characteristics when exposed to electromagnetic radiation. In one embodiment, print media 6 coats at least a portion of mass storage media 4. Print media 6 is divided into at least one track 20. In one embodiment, track 20 is a spiral track on mass storage media 4. In an alternate embodiment, tracks 20 are concentric rings on mass storage media 4.

In one embodiment, mass storage device 2 includes electromagnetic radiation emitter 8, focus detector 10, offset controller 12, radial positioner 14, and optionally, a computer 16, and program storage system 18.

Electromagnetic radiation emitter 8 is any device configured to produce electromagnetic radiation directed at tracks 20 of print media 6. In one embodiment, electromagnetic radiation emitter 8 is a laser emitter that emits a coherent beam of electromagnetic radiation having a wavelength of 780 nanometers.

Focus detector 10 is any combination of hardware and executable code configured to discover a focal distance between electromagnetic radiation emitter 8 and print media 6. In one embodiment, the focal distance is the distance from print media 6 at which electromagnetic radiation emitter 8 emits a focused spot of electromagnetic radiation onto print media 6.

Offset controller 12 is any combination of hardware and executable code configured to determine a focus offset for electromagnetic radiation emitter 8 and communicate the focus offset to radial positioner 14.

Radial positioner 14 is any combination of hardware and executable code configured to position electromagnetic radiation emitter 8 the focal distance from print media 6, displaced by a focus offset to create a defocused spot of electromagnetic radiation within tracks 20. The defocused spot darkens print media 6 within tracks 20. The defocused spot creates a larger spot size than with the conventional focused spot size.

Computer 16 is any combination of hardware and executable code configured to execute executable code stored in program storage system 18. Although pictured and discussed as separate from computer 16, focus detector 10, and offset controller 12 are alternatively integral with or have portions integral with computer 16.

Program storage system 18 is any device or system configured to store data or executable code. Program storage system 18 may also be a program storage system tangibly embodying a program, applet, or instructions executable by computer 16 for performing the method steps of the present invention executable by computer 16. Program storage system 18 may be any type of storage media such as magnetic, optical, or electronic storage media.

Program storage system 18 is illustrated in FIG. 1 as a single device. Alternatively, program storage system 18 may include more than one device. Furthermore, each device of program storage system 18 may be embodied in a different media type. For example, one device of program storage system 18 may be a magnetic storage media while another device of program storage system 18 is an electronic storage media.

Figure 2:
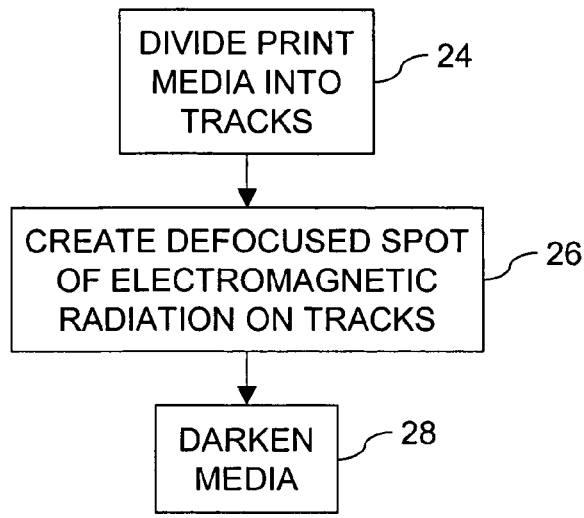
FIG. 2 is a flow chart illustrating one embodiment of the present invention method for enhancing optical density on print media darkened by exposure to electromagnetic radiation.

FIG. 2 is a flow chart representing steps of one embodiment of the present invention. Although the steps represented in FIG. 2 are presented in a specific order, the present invention encompasses variations in the order of steps. Furthermore, additional steps may be executed between the steps illustrated in FIG. 2 without departing from the scope of the present invention Print media 6 is divided 24 into at least one track 20. In one embodiment, print media 6 is divided 24 into a plurality of concentric ring tracks 20. In an alternate embodiment, print media 6 is divided into a spiral track 20.

Figure 3:
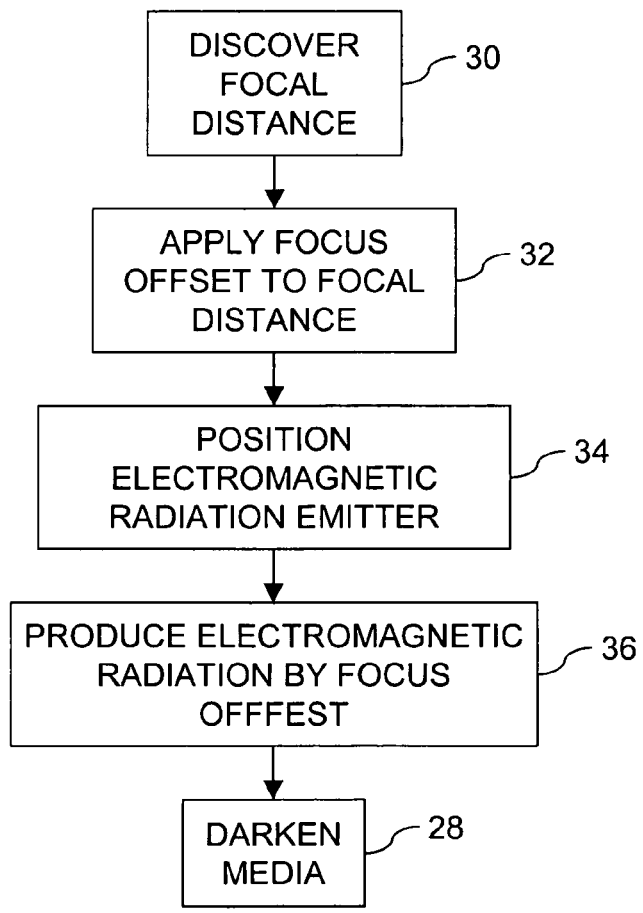
FIG. 3 is a flow chart illustrating another embodiment of the present invention method for using an electromagnetic emitter to enhance optical density on print media darkened by exposure to electromagnetic radiation.

A defocused spot of electromagnetic radiation is created 26 within tracks 20. The defocused spot darkens 28 or otherwise changes the optical characteristic of print media 6 within tracks 20. In one embodiment, as illustrated in FIG. 3, the defocused spot of electromagnetic radiation is created by discovering 30 a focal distance between electromagnetic radiation emitter 8 and print media 6. A focus offset is applied 32 to the focal distance. The focus offset may be any distance that achieves the desired effect (see FIGS. 4-6 for examples). In one embodiment, the focus offsets is any distance of at least 20 microns. In another embodiment, the focus offset is any distance no more than 80 microns.

Electromagnetic radiation emitter 8 positions 34 the focal distance from print media 6, displaced by the focus offset. Electromagnetic radiation emitter 8 produces 36 electromagnetic radiation directed at print media 6. The focus offset is either a positive or a negative amount of distance (see FIG. 4).

In one embodiment, discovering 30 the focal distance between electromagnetic radiation emitter 8 and print media 6 includes discovering 30 the distance from print media 6 at which electromagnetic radiation emitter 8 emits a focused spot of electromagnetic radiation on print media 6. Several different focusing algorithms can be used. For instance, table based, feed forward, or adaptive servo algorithms described in the related applications can be used to discover the focal distance to the print media 6.

FIG. 3 is a flow chart also representing steps of another embodiment of the present invention. Although the steps represented in FIG. 3 are presented in a specific order, the present invention encompasses variations in the order of steps. Furthermore, additional steps may be executed between the steps illustrated in FIG. 3 without departing from the scope of the present invention.

A focal distance is discovered 30 between electromagnetic radiation emitter 8 and print media 6. Electromagnetic radiation emitter 8 is positioned 34 the focal distance from print media 6, displaced by a focus offset. The focus offset is either a positive or a negative amount of distance.

In one embodiment, the focal distance between electromagnetic radiation emitter 8 and print media 6 is discovered 30 by discovering 30 the distance from print media 6 at which electromagnetic radiation emitter 8 emits a focused spot of electromagnetic radiation on print media 6. As previously discussed, the related applications disclose a few of many alternative methods for discovering the distance from the print media 6 to the emitter 8.

Electromagnetic radiation emitter 8 produces 36 electromagnetic radiation directed at print media 6 to create a defocused spot of electromagnetic radiation within track 20. The defocused spot darkens 28 print media 6 within the tracks 20.

One advantage of the system and method of the present invention is that optical density is increased in the print media without a sacrifice in speed. The tracks may be marked at the same speed as with a focused spot of electromagnetic radiation, but yield a higher optical density when marked with the defocused spot.

For example, print media 6 that are activated or written by light or other electromagnetic energy requires an optimum radiation intensity over a specific time period to give maximum optical density (OD). For focusing type systems, especially those with a high numerical aperture (such as compact disc and DVD systems), modest offsets in the objective lens focal distance (with radial positioner 14) result in significant changes in spot size on the print media 6. By offsetting the focal (Z axis) distance of the objective lens by a specified amount, from a minimum spot size focal distance, significant improvements in optical density can be achieved. Empirical tests show a 30%-100% increase in optical density.

Figure 4:
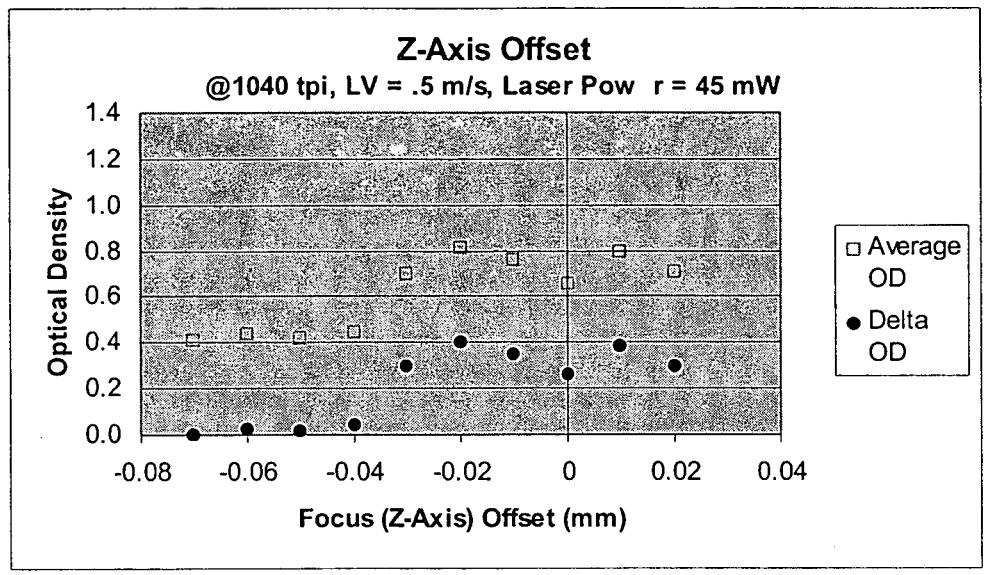
FIG. 4 is a chart illustrating optical density versus focus offset for a laser power of 45 mWatts.
Figure 5:
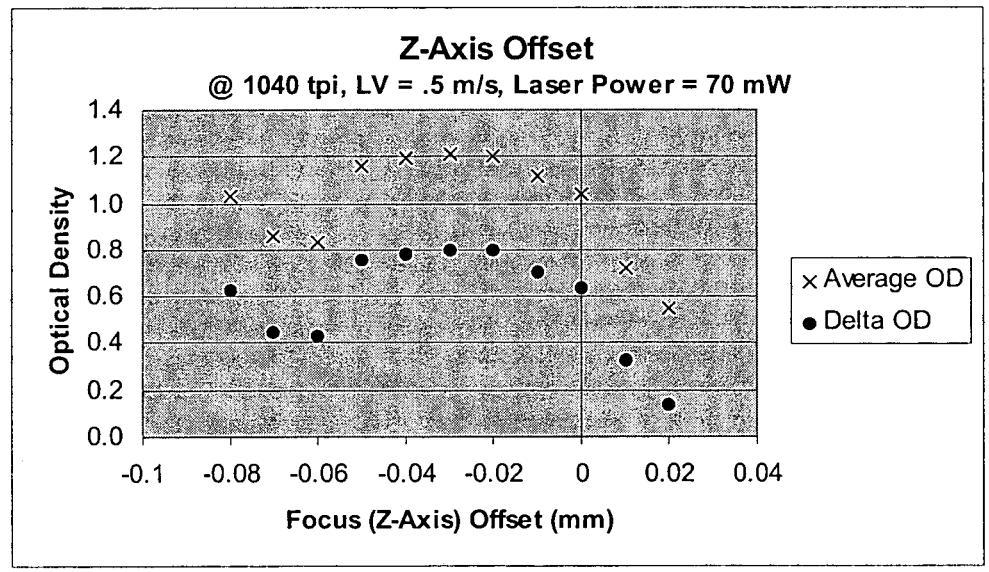
FIG. 5 is a chart illustrating optical density versus focus offset for a laser power of 70 mWatts.

As exemplary data, FIGS. 4 and 5 illustrate the change in OD vs. the focus offset in the Z axis (focal distance) of the radial positioner 14 for a track density of 1040 tracks per inch and a linear speed of a laser at 0.5 m/sec. FIG. 4 illustrates the change in OD vs. offset for a laser power of 45 mWatts and FIG. 5 illustrates the change in OD vs. offset for a laser power of 70 mWatts. The Delta OD is the difference between the OD of the non-marked area and the OD of the marked area. The Average OD is the overall OD from the marked surface. As the track width is widened (see FIG. 6) to encompass the area between the tracks, the non-marked area decreases and thus the Average OD is increased closer to that of the marked area itself. As can be seen, the Delta OD and the Average OD track quite closely.

Figure 6:
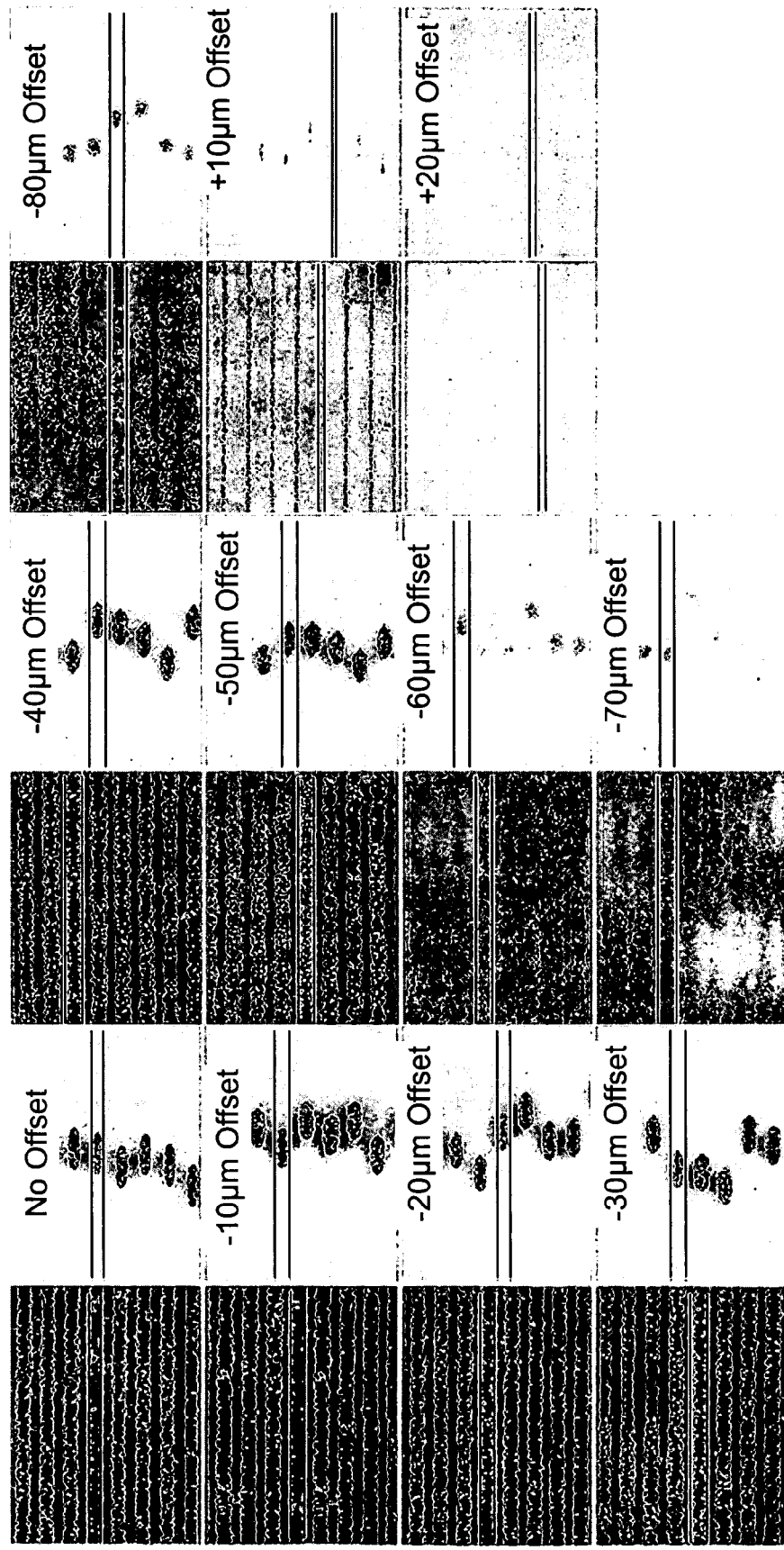
FIG. 6 is a collection of images of a print media showing multiple tracks and spot sizes for various focus offsets using a 70 mWatt laser power.

FIG. 6 is a collection of experimental images of a test print media 6 having tracks 20 at a track spacing of 1040 tracks per inch and written with a 70 mWatt laser (emitter 8) at a track speed of 0.5 m/sec. Also, shown next to the tracks 20 are spot sizes 40 to illustrate single pixels. As can be seen with the no offset example, the tracks are spaced apart by a wide distance. However, as the offset distance is increased in the negative direction, the OD increases until about −50 um at which point the amount of power/area in the defocusing in unable to properly mark the print media 6. By −60 um, the OD is noticeably decreased as also shown in FIG. 5. Also shown, is the effect of offsetting the focus in the positive direction. For the laser power set at 70 mWatts, the OD actually decreases as the positive offset is increased as shown in FIGS. 5 and 6. However, for lower laser powers, such as 45 mWatts in FIG. 4, the OD can actually increase but then decrease as the offset is further increased. Those of skill in the art will appreciate that the actual offset distance to maximize the OD will be dependent upon the print media 6, the electromagnetic emitter 8 and its corresponding power level, and the speed of the print media 6 with respect to the electromagnetic emitter 8. FIGS. 4-6 are only used to illustrate one particular exemplary embodiment.

The foregoing description is only illustrative of some embodiments of the invention. Various alternatives and modifications can be devised by those skilled in the art without departing from the invention. For instance, the print media can be rotated by a motor with respect to a emitter 8 that is radially positioned. Alternatively, the print media 6 can remain stationary and the emitter 8 moved relative to the print media 6. The print media 6 can also be material other than a optical disc. Accordingly, the present invention embraces all such alternatives, modifications, and variances that fall within the scope of the appended claims.

What is claimed is:

1. A mass storage device for use with mass storage media have a print media coating at least a portion of the mass storage media, the print media darkened by exposure to electromagnetic radiation and divided into at least one track; the mass storage device comprising:
   an electromagnetic radiation emitter configured to produce electromagnetic radiation directed at the at least one track of the print media;
   a focus detector configured to discover a focal distance between the electromagnetic radiation emitter and the print media;
   a radial positioner configured to position the electromagnetic radiation emitter the focal distance from the print media, displaced by a focus offset to create a defocused spot of electromagnetic radiation at a location of the at least one track to result in a darkened mark at the defocused spot,
   wherein the defocused spot at the location permits the darkened mark at the defocused spot to have a maximum optical density,
   wherein the electromagnetic radiation emitter is to produce the electromagnetic radiation that has a relationship with the print media in which the focus offset does not correlate with a size of the defocused spot of electromagnetic radiation created on the print media, such that one or more first decreases of the focus offset result in corresponding decreases in the size of the defocused spot and one or more second decreases of the focus offset result in corresponding increases in the size of the defocused spot.

2. The mass storage device of claim 1 further including an offset controller configured to determine the focus offset and communicate the focus offset to the radial positioner.

3. The mass storage device of claim 1 wherein the electromagnetic radiation emitter includes a laser emitter.

4. The mass storage device of claim 1 wherein the focus detector is further configured to discover the distance from the print media at which the electromagnetic radiation emitter emits a focused spot of electromagnetic radiation on the print media.

5. A mass storage device for use with mass storage media have a print media coating at least a portion of the mass storage media, the print media darkened by exposure to electromagnetic radiation and divided into at least one track; the mass storage device comprising:
   an electromagnetic radiation emitter configured to produce electromagnetic radiation directed at the at least one track of the print media;
   detecting means for discovering a focal distance between the electromagnetic radiation emitter and the print media;
   placement means for positioning the electromagnetic radiation emitter the focal distance from the print media, displaced by a focus offset to create a defocused spot of electromagnetic radiation at a location of the at least one track to result in a darkened mark at the defocused spot, the defocused spot at the location permitting the darkened mark at the defocused spot of electromagnetic radiation to have a maximum optical density,
   wherein the electromagnetic radiation emitter is to produce the electromagnetic radiation that has a relationship with the print media in which the focus offset does not correlate with a size of the defocused spot of electromagnetic radiation created on the print media, such that one or more first decreases of the focus offset result in corresponding decreases in the size of the defocused spot and one or more second decreases of the focus offset result in corresponding increases in the size of the defocused spot.

6. The mass storage device of claim 5 further including means for determining the focus offset and means for communicating the focus offset to the placement means.

7. The mass storage device of claim 5 wherein the electromagnetic radiation emitter includes a laser emitter.

8. The mass storage device of claim 5 wherein the detecting means includes means for discovering the distance from the print media at which the electromagnetic radiation emitter emits a focused spot of electromagnetic radiation on the print media.

* * * * *